US011041789B2

(12) United States Patent
K et al.

(10) Patent No.: US 11,041,789 B2
(45) Date of Patent: Jun. 22, 2021

(54) INTEGRATED SYSTEM AND METHOD FOR IN-SITU 3-AXIS SCANNING AND DETECTING DEFECTS IN OBJECT UNDER STATIC AND CYCLIC TESTING

(71) Applicant: Illinois Tool Works Inc., Glenview, IL (US)

(72) Inventors: Pradeep K, Puttur (IN); Chandru Haralakere Puttaswamy, Bengaluru (IN); Murali Mohan, Bangalore (IN); Sunder Ramasubbu, Bangalore (IN); Somayya Ammanagi, Bangalore (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/314,264

(22) PCT Filed: Jun. 29, 2017

(86) PCT No.: PCT/IB2017/053912
§ 371 (c)(1),
(2) Date: Dec. 28, 2018

(87) PCT Pub. No.: WO2018/002871
PCT Pub. Date: Jan. 4, 2018

(65) Prior Publication Data
US 2020/0182758 A1  Jun. 11, 2020

(30) Foreign Application Priority Data
Jul. 1, 2016 (IN) .............................. 201641022664

(51) Int. Cl.
*G01N 3/20* (2006.01)
*G01N 3/06* (2006.01)
*G01N 27/9013* (2021.01)

(52) U.S. Cl.
CPC ............... *G01N 3/066* (2013.01); *G01N 3/20* (2013.01); *G01N 27/902* (2013.01); *G01N 2203/0635* (2013.01)

(58) Field of Classification Search
None
See application file for complete search history.

(56) References Cited

U.S. PATENT DOCUMENTS 5,948,994 A    9/1999  Jen
6,904,305 B2 * 6/2005  Tsekos ................. A61B 5/0555
                                                              600/417

(Continued)

FOREIGN PATENT DOCUMENTS

CN    2608939    3/2004
CN    1815139    8/2006

(Continued)

OTHER PUBLICATIONS

Int'l Search Report and Written Opinion Appln. No. PCT/IB2017/053912 dated Oct. 20, 2017 (14 pgs).

(Continued)

*Primary Examiner* — Peter J Macchiarolo
*Assistant Examiner* — Jermaine L Jenkins
(74) *Attorney, Agent, or Firm* — McAndrews, Held & Malloy, Ltd.

(57) ABSTRACT

The present invention relates to an integrated system and method for in-situ 3-axis scanning and detecting defects in a CFRP composite (150) being loaded under static and cyclic test conditions. The system comprises a test system integrated with (10) a scanning system (20) that comprises a probe assembly (52) to generate eddy current on the surface of the CFRP composite (150) mounted on the test system, and a 3D scanner assembly (60) for movement of the probe assembly (50) over the entire surface area of the (Continued)

CFRP composite (150) along X-axis, Y-axis and Z-axis. An operator console (70) is connected to the test system and the scanning system (20) for controlling (3) mechanical test process in the test system and for controlling 3-dimensional movement of the probe assembly (52) along X-axis, Y-axis and Z-axis in a synchronous manner. Such system and method achieve (3D) automated and synchronized 3D scanning of the CFRP composite (150) to accurately detect the defects in the CFRP composite (150) before/during/after mechanical testing without interrupting the mechanical test process.

21 Claims, 10 Drawing Sheets

(56) References Cited

U.S. PATENT DOCUMENTS

| | | | | |
|---|---|---|---|---|
| 10,119,108 | B2* | 11/2018 | Maggiore | B33Y 40/00 |
| 2004/0118309 | A1* | 6/2004 | Fedor | B29C 64/165 |
| | | | | 101/480 |
| 2017/0072632 | A1* | 3/2017 | Page | G05B 19/4099 |
| 2017/0348854 | A1* | 12/2017 | Oleynik | A47J 47/02 |

FOREIGN PATENT DOCUMENTS

| | | |
|---|---|---|
| CN | 202614183 | 12/2012 |
| CN | 104215503 | 12/2014 |
| CN | 104297065 | 1/2015 |
| CN | 204255763 | 4/2015 |
| CN | 105486745 | 4/2016 |
| DE | 102014117079 | 5/2016 |

OTHER PUBLICATIONS

M. Schulze, S. Goldbach, H. Heuer, N. 1-21 Meyendorf: "Ein Methodenvergleich—ZfP an Kohlefaserverbundwerkstoffen mittels wirbelstrom—und ultrashallbasierender Pri.ifverfahren", Apr. 27, 2012 (Apr. 27, 2012), pp. 1-16, XP055413011.

J. R Davis: "Tensile testing, second edition", Dec. 31, 2004 (Dec. 31, 2004), pp. 1-283, XP055414903 Materials Park, Ohio, United States ISBN: 978-0-87170-806-9. pp. 66-67.

* cited by examiner (a)

(b)

INTEGRATED SYSTEM AND METHOD FOR IN-SITU 3-AXIS SCANNING AND DETECTING DEFECTS IN OBJECT UNDER STATIC AND CYCLIC TESTING

CROSS-REFERENCE TO RELATED APPLICATIONS

The present application is a national stage application under 35 U.S.C. § 371 of application Serial No. PCT/IB2017/053912, filed on Jun. 29, 2017, and entitled "INTEGRATED SYSTEM AND METHOD FOR IN-SITU 3-AXIS SCANNING AND DETECTING DEFECTS IN OBJECT UNDER STATIC AND CYCLIC TESTING." The aforementioned application is hereby incorporated herein by reference in its entirety.

FIELD OF THE INVENTION

The present embodiment generally relates to scanning of an object subject to testing under static and cyclic loading. The present embodiment relates in more particular to an integrated system and method for in-situ 3-axis scanning and detecting defects in the CFRP composite materials being loaded under the static and cyclic test conditions.

BACKGROUND OF THE INVENTION

In general, Carbon Fiber Reinforced Polymers or Plastics (CFRP) composite materials are used in wide range of applications in: (a) aerospace for manufacturing aircraft; (b) shipping to manufacture ships, boats etc.; (c) automobiles for manufacturing high-speed vehicles; (d) sports equipment for manufacturing tennis, badminton, hockey and cricket bats, bicycle rims, wheels, and frames; (e) civil engineering to enhance the strength of concrete, timber etc.; (f) musical instruments to manufacture guitar, violin, drums; (g) firearms to replace wood or metallic components; (h) furniture like tripod legs, fishing rods, billiards, and walking sticks; and (i) dentistry to replace canal tooth. These wide range of applications of the CFRP composites are due to its superior properties like: (i) high strength to weight ratio; (ii) high stiffness; (iii) anisotropic electrical conductivity; (iv) low thermal expansion coefficients; (v) high resistance to fatigue; (vi) corrosion resistant and chemically stable; (vii) inflammable; (viii) thermally stable and more conductive.

But, these CFRP composites are quite often found to have defects due to faults in manufacturing or external loading patterns during its service life. Some of the defects of the CFRP composites include delamination, voids, stacking disorder, inclusions, moisture, impact damage, fiber breakage and misalignment. The persistence of these defects in the CFRP composites can lead to serious consequences when it is used in various applications. Hence, it is essential to detect these defects to avoid such consequences and increase the service life of the CFRP composites. These defects cannot be noticed by the naked eyes and are required to be detected without altering the material and geometric properties.

The defects and damages in the CFRP composites can be detected in numerous ways, but the conventional detection methods are frequently limited to certain kinds of materials and structural geometries. Specifically, it requires sophisticated non-destructive testing (NDT) methods such as ultrasonic thickness measurement (A-scan), ultrasonic linear scan (B-scan), ultrasonic through-transmission scan (C-scan), acoustography (AC), laser ultrasound (LU), membrane resonance (MR), acoustic emission (AE), acousto-ultrasonics (AU), laser stereography (LS), eddy current testing (ECT), transient thermography (TT), lock-in thermography (LT), vibro thermography (VT), X-Radiography (XR), X-Ray Tomography (XT), X-Ray Backscatter (XB) and acoustic impact (AI). The specific response of the eddy current measurements to carbon fibers in the CFRP composites and absence of need to prepare specimen (CFRP) surface make eddy current testing suitable for detection of damages in the form of delamination and fiber breakage.

In the existing methods of the NDT techniques for the CFRP composites, the specimen, i.e. CFRP composites is tested offline and is not subjected to any loadings during NDT. This non-destructive CFRP scanning requires high-precision displacement controlled three-dimensional manipulator (gantry system) to move the sensor over the surface area of the CFRP composites. In the set-up of non-destructive eddy current testing (ECT) methods, an electromagnetic signal is produced in the CFRP composites or objects under test, where the CFRP composites have an electrical conductivity. This results in formation of Eddy currents in the CFRP composites, where the changes in these eddy currents around the flaw are analyzed to detect the defects in the CFRP composites.

FIG. 1 illustrates a schematic view of a system (1) for offline scanning of a CFRP composite (4) using an eddy current sensor (3), in accordance with the prior art. The prior-art system (1) as well as its method of scanning CFRP composites (4) are basically restricted to offline scanning: (a) to detect manufacturing defects in the CFRP composite sample (4) immediately after production; (b) to detect condition of the CFRP specimen (4) during its service life or during simulation of service life conditions in the laboratory, i.e. after testing the CFRP composite (4) using an independent test system with various load conditions.

In the offline scanning shown in FIG. 1, the CFRP composite sample (4) is placed on the flat surface area over which the eddy current sensor probe (3) is moved using a 3D (linear movements along X-, Y- and Z-axis) gantry system (2) or manipulator. The laser displacement sensor, accompanying the probe (3), provides the distance between the surface of the CFRP composite (4) and the tip of the probe (3). This servo-controlled XYZ-scanner (2) facilitates to scan the entire surface area of the CFRP sample (4) to detect defects in the CFRP composite (4). However, this independent system (1) cannot be used for scanning of the CFRP sample simultaneously while the CFRP composite (4) is being loaded under static or cyclic test conditions on the mechanical test system.

But, in these conventional systems and methods, the testing under various load conditions and scanning are separately carried out. There is no single system to scan the CFRP composite simultaneously while it is being loaded under static or cyclic test conditions on the test system. In the conventional methods, the CFRP composite is mounted on the material testing system for testing the mechanical behavior of the CFRP composite by applying various loads. The specimen is placed over independent scanner to detect the defects in it before and after applying mechanical loads.

By following the conventional approaches, it is not possible to scan and detect the growth of defects in the CFRP composite when it is simultaneously tested with various static and cyclic loading conditions. Further, it is complex, trouble-some and tedious to use independent scanner and test system to detect the defects in the CFRP composite, which may also lead to inaccurate detection of the defects in the CFRP composite due to any mishandling of CFRP composite after the mechanical testing and before scanning.

Accordingly, there is a need in that art to provide a solution to one or more of above said problems. The present embodiment overcomes many of these problems in a unique and economical manner Therefore, it is desirable to provide an integrated system and method for in-situ 3-axis scanning and detecting defects in the CFRP composite material while it is being tested in laboratory for mechanical behavior under static or cyclic loading conditions, which can overcome the above-mentioned problems and drawbacks.

SUMMARY OF THE INVENTION

A principle object of the present invention is to provide an integrated system for in-situ 3-axis scanning and detecting defects in the CFRP composite materials being loaded under the static and cyclic test conditions, which achieves integration of servo-controlled test system for simulating service loads on the CFRP composites and scanning system (eddy current sensor and gantry system) for automated and synchronized 3D scanning of the CFRP composite before/during/after mechanical testing applied on the CFRP composite without the need for removal of the CFRP composite from the test system.

Another object of the present invention is to provide an integrated system for in-situ 3-axis scanning and detecting defects in the CFRP composite materials being loaded under the static and cyclic test conditions, which increases accuracy of analysis of the defects in the CFRP composite.

Another object of the present invention is to provide an integrated system for in-situ 3-axis scanning and detecting defects in the CFRP composite materials being loaded under the static and cyclic test conditions, which is simple and economical to save enormous amount of time in both testing and scanning process.

Yet another object of the present invention is to provide a method for in-situ 3-axis scanning and detecting defects in the CFRP composite materials being loaded under the static and cyclic test conditions, which can achieve 3D scanning of the CFRP composites mounted on the test system without interrupting mechanical test process.

According to one embodiment, the present invention, which achieves this objective, relates to an integrated system for in-situ 3-axis scanning and detecting defects in an object being loaded under static and cyclic test conditions. The system comprises a test system having an actuator and a cross-head assembly that are actuated by a plurality of hydraulic units for applying a desired load and displacement on the object under test. A fixture assembly has a plurality of fixture elements and a plurality of gripping elements which are attached between the actuator and the cross-head assembly for holding the object under test. A scanning system is integrated with the test system through a pair of supporting columns. The scanning system comprises a probe assembly having at least one non-destructive sensing probe to generate and measure eddy current on the surface of the object under test and at least one sensing unit to measure distance between the probe tip and the surface of the object under test; and a 3D scanner assembly having a XYZ gantry system arranged with a plurality of transmission elements that is associated with the probe assembly for movement of the probe assembly along X-axis, Y-axis and Z-axis such that the probe is moved over the entire surface area of the object under test for 3D scanning of the object under test. An operator console is secured with a holder assembly mounted on the test system, wherein the operator console is operatively connected to the test system and the scanning system for controlling movement of the actuator and the cross-head assembly through the hydraulic units and for controlling 3-dimensional movement of the probe assembly along X-axis, Y-axis and Z-axis through the XYZ gantry system in a synchronous manner Such integrated test and scanning system achieves automated and synchronized 3D scanning of the CFRP composite mounted on the test system to accurately detect the growth of defects in the CFRP composite before/during/after mechanical testing applied on the CFRP composite without the need for removal of the CFRP composite from the test system.

Further, the non-destructive sensing probe comprises an eddy current sensing probe that is loaded with a spring and secured into a fixture of the probe assembly in such a way to position a probe tip with respect to the surface of the object under test. The sensing unit comprises a laser sensor that is placed adjacent to the probe. The transmission elements are attached to a supporting frame which is secured to the supporting columns of the test system. Each of the transmission elements is interdependently operated by motors and electric drives controlled by the operator console to provide rotary-to-linear motion transmission. The fixture and gripping elements are respectively composed of upper and lower fixture elements, and upper and lower gripping elements for mounting the object under test. The cross-head assembly is housed with a load cell and servo-controlled by the hydraulic units to apply the desired load on the object under test. The object under test comprises a CFRP (Carbon Fiber Reinforced Polymers or Plastics) composite material and a bi-directional CFRP laminate.

The operator console is operatively connected to the test system and the scanning system through a multi-channel control and data acquisition system housed in the test system for operating the hydraulic units and the electric drives to drive the actuator, the cross-head assembly, the probe and the sensing unit of the probe assembly, and the transmission elements of the XYZ gantry system. The operator console is configured to execute test sequences of applying loads and scanning of the object under test, display online test status, diagnose test system health and safety actions, and generate test reports and notifications. The operator console controls the gripping elements of the fixture assembly for securely holding the object under test even during the static and cyclic test conditions.

Moreover, the transmission elements comprise first, second, third and fourth transmission elements each formed with one or more rails on it, where the transmission elements are coupled with each other through couplers for 3-dimensional movement of the transmission elements with respect to the object under test. The first and second transmission elements are vertically attached to the supporting frame with reference to the test system. The third transmission element is horizontally coupled between the first and second transmission elements such that the third transmission element is movable on the rails of the first and second transmission elements in an upward and downward directions with respect to the object under test for movement of the probe assembly along the X-axis. The fourth transmission element is coupled to the third transmission element in perpendicular to the surface of the object under test such that the fourth transmission element is movable on the rails of the third transmission element in a crosswise direction with respect to the object under test for movement of the probe assembly along the Y-axis. The probe assembly is placed in parallel and coupled to the fourth transmission element such that the probe assembly is movable along with the rails of the fourth transmission element in a backward and forward direction with respect to the object under test for movement of the probe assembly along the Z-axis.

According to another embodiment, the present invention, which achieves this objective, relates to a method for in-situ 3-axis scanning and detecting defects in an object being loaded under static and cyclic test conditions. The method comprises the steps of: mounting the object under test between upper and lower gripping and fixture elements of a fixture assembly at a zero load condition; positioning a non-destructive sensing probe at top-left and bottom-right corners of the object under test to record X and Y coordinates of a 3D scanner assembly while maintaining a desired distance between the object under test and the probe; determining an entire scan area of the object under test based on the recorded X and Y coordinates of the 3D scanner assembly; measuring distance between a tip of the sensing probe and the surface of the object under test; scanning the determined scan area of the object under test by operating and controlling 3-dimensional movement of the probe along X-axis, Y-axis and Z-axis through a plurality of transmission elements of a XYZ gantry system; generating and measuring eddy current on the surface of the object under test by the probe to determine defects in the object under test at the zero load condition; and applying a desired load and displacement on the object under test by actuating an actuator and a cross-head assembly of a test system through a plurality of hydraulic units, and synchronously repeating the measuring and scanning steps to analyze the occurrence of defects in the object under test during and after loading at different load conditions and different intervals. This method can achieve 3D scanning of the CFRP composites mounted on the test system without interrupting mechanical test process, and also save enormous amount of testing time.

In addition, the step of generating and measuring eddy current on the surface of the object under test by the probe, further comprising the steps of: passing a high-frequency alternating current to generate a transient magnetic field in the probe; magnetically coupling the probe and the object under test with the movement of the probe over the surface of the object under test to generate and penetrate eddy current on and into the surface of the object under test; measuring voltage across the probe to detect self-induced electromagnetic force (EMF) and mutual induction between the probe and the object under test; and while scanning, determining whether any change in the voltage across the probe to detect the defects in the object under test. The movement of sensing probe is controlled to scan the object under test in a coarse scan to rapidly detect the zones of defects in the object under test and in a fine scan to detect the in-depth defects in each identified defect zone in the object under test. The scanning and testing of the object under test are synchronized to establish correlation between the growth of defects and physical behavior of the object under test. The object under test comprises a CFRP (Carbon Fiber Reinforced Polymers or Plastics) composite material and a bi-directional CFRP laminate.

BRIEF DESCRIPTION OF THE DRAWINGS

The foregoing summary, as well as the following detailed description of preferred embodiments, is better understood when read in conjunction with the appended drawings which show, by way of example only one form of this present invention. To illustrate the application of the invention, there it is shown in the drawings: construction and implementation of the invention. However, the invention is not limited to the specific systems and methods disclosed. The invention will be discussed in greater detail with reference to the accompanying figures.

DETAILED DESCRIPTION OF THE INVENTION

Figure 1:
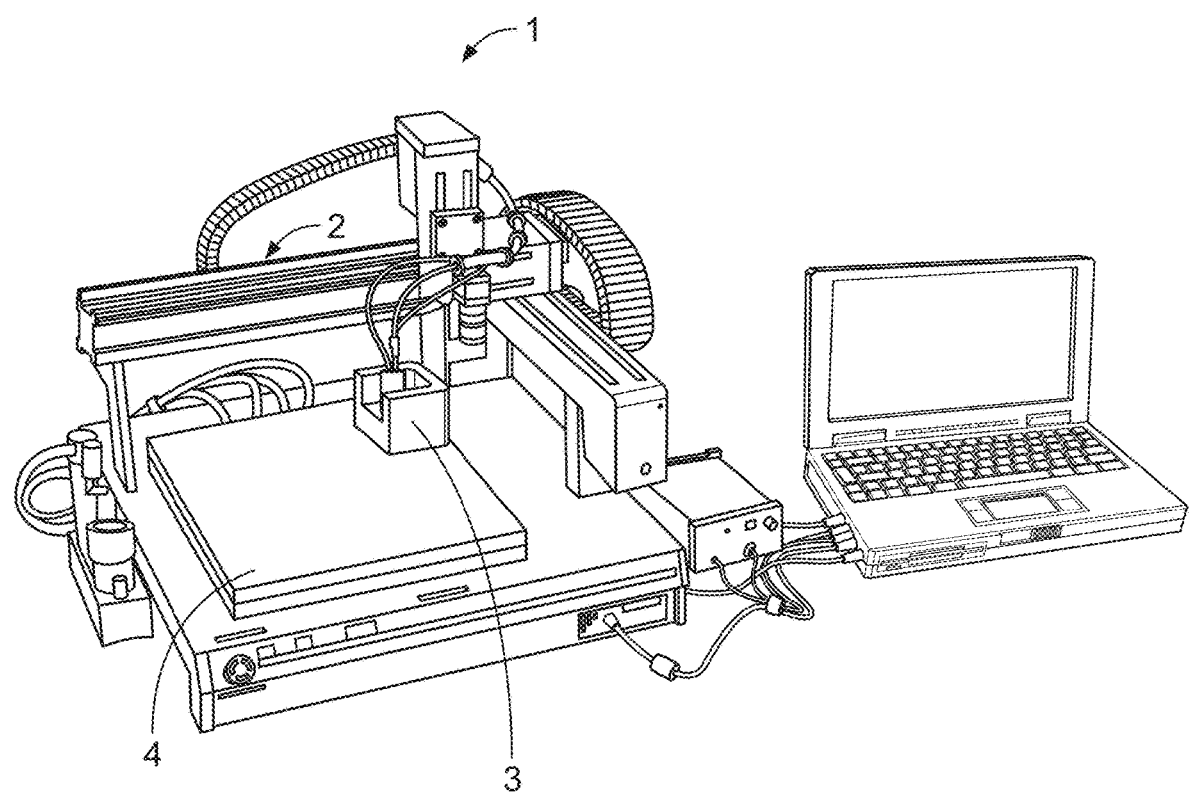
FIG. 1 illustrates a schematic view of a system for offline scanning of a CFRP composite using an eddy current sensor, in accordance with the prior art.

The present invention is now described with reference to the drawings, wherein reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention. An integrated system and method for in-situ 3-axis scanning and detecting defects in the CFRP composite material while it is being tested in laboratory for mechanical behavior under static or cyclic loading conditions, are described herein.

The following description is of exemplary embodiment of the invention only, and is not the limited scope, applicability or configuration of the invention. Rather, the following description is intended to provide a convenient illustration for implementing various embodiments of the invention. As will become apparent, various changes may be made in the function and arrangement of the structural/operational features described in these embodiments without departing from the scope of the invention as set forth herein. It should be appreciated that the description herein may be adapted to be employed with alternatively configured devices having different shapes, components, and the like and still fall within the scope of the present invention. Thus, the detailed description herein is presented for the purposes of illustration only and not of limitation.

Figure 2:
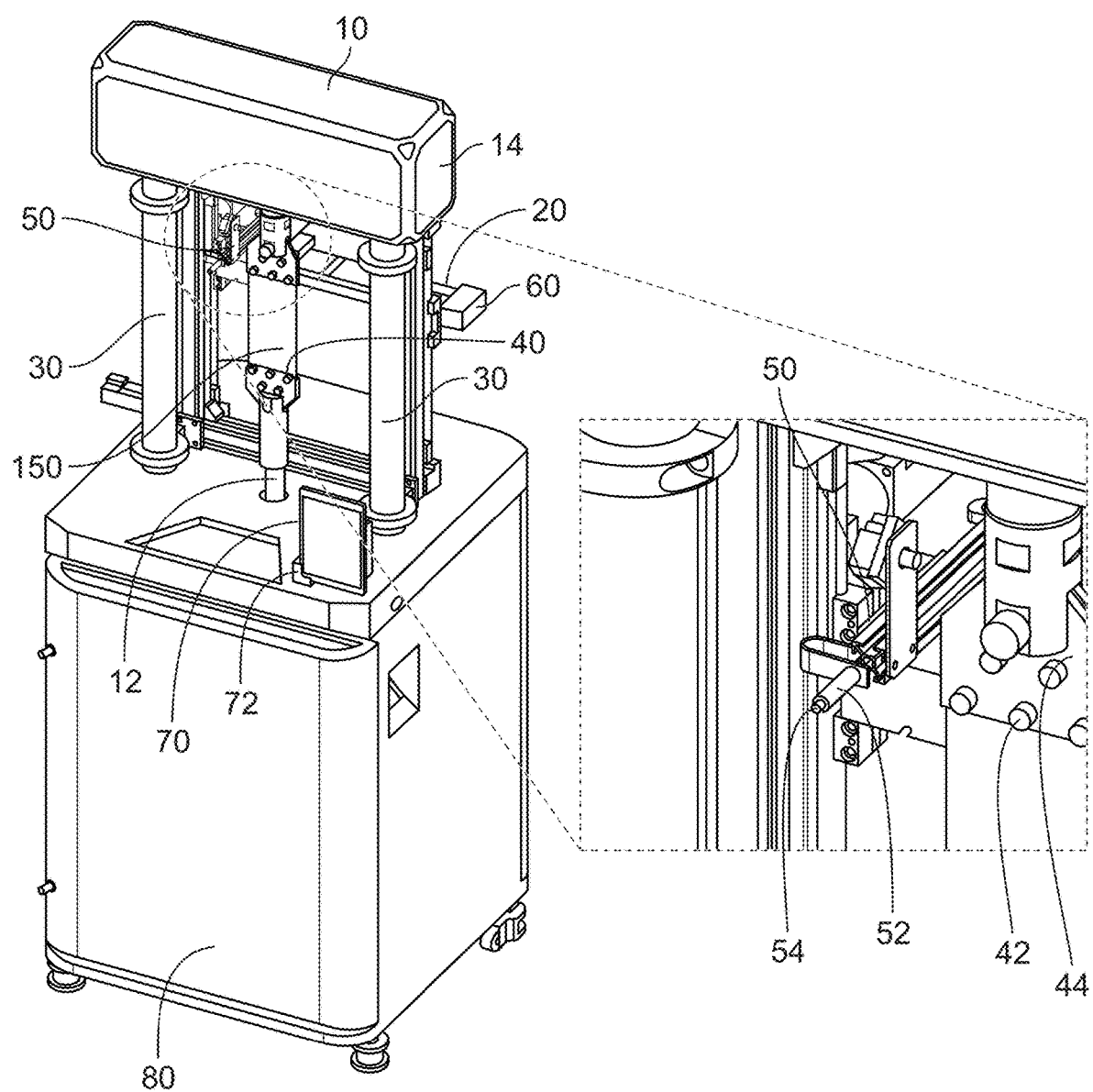
FIG. 2 illustrates a schematic view of an integrated system with a 3D (three-dimensional) scanning system and a test system for in-situ 3-axis scanning and detecting defects in CFRP composite materials being loaded under static and cyclic test conditions, in accordance with an exemplary embodiment of the present invention.

FIG. 2 illustrates a schematic view of an integrated system (100) with a 3D (three-dimensional) scanning system (20) and a test system (10) for in-situ 3-axis scanning and detecting defects in CFRP composite materials (150) being loaded under static and cyclic test conditions, in accordance with an exemplary embodiment of the present invention. The system comprising a 3D scanner system that is integrated with a servo controlled test system (10) for scanning of an object under test (CFRP composite material) (150) using eddy current sensor (52). In particular, the system integrates the servo-controlled test system (10) for simulating service loads on the CFRP composites (150) and the scanning system (20) (eddy current sensor (52) and gantry system (62)) for 3D scanning of the CFRP composites (150). This system facilitates to detect the defects in the CFRP composite material (150) before/while/after mechanical testing without affecting its mechanical properties with no need to unmount the CFRP composite material (150). In this document, the CFRP composites (150) can be referred as, but not limited to CFRP composite material, bi-directional CFRP laminate), CFRP sample, object under test and specimen, which are all relating to CFRP composites only.

Figure 3A:
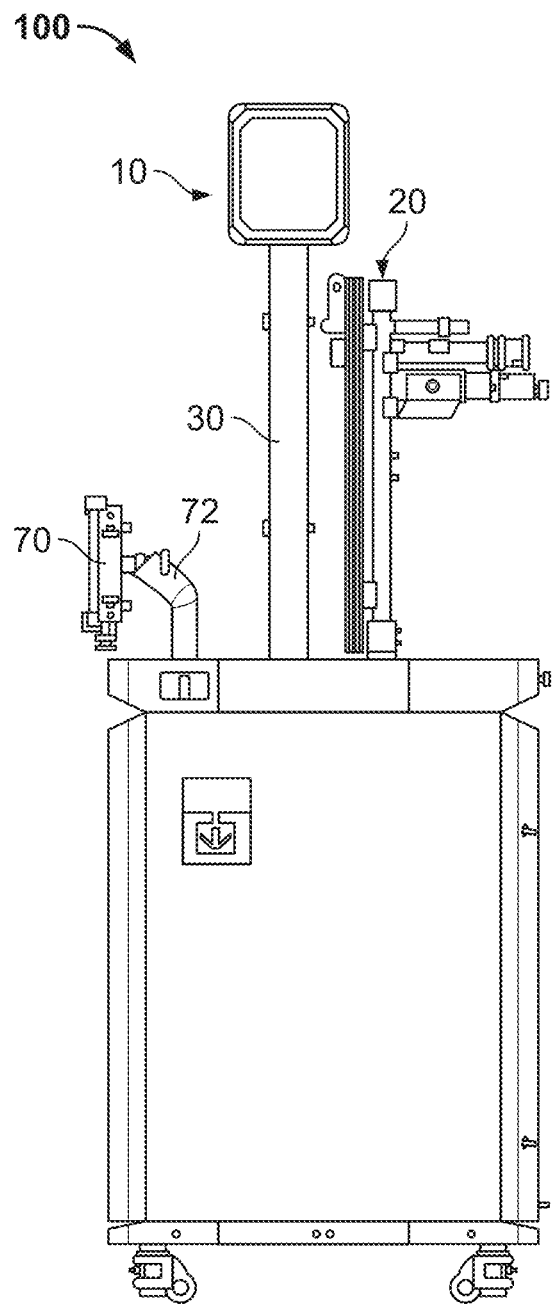
FIGS. 3a & 3b respectively illustrate side and rear views of the integrated system as shown in FIG. 2, with the 3D scanning system and the test system, in accordance to an exemplary embodiment of the present invention.
Figure 3B:
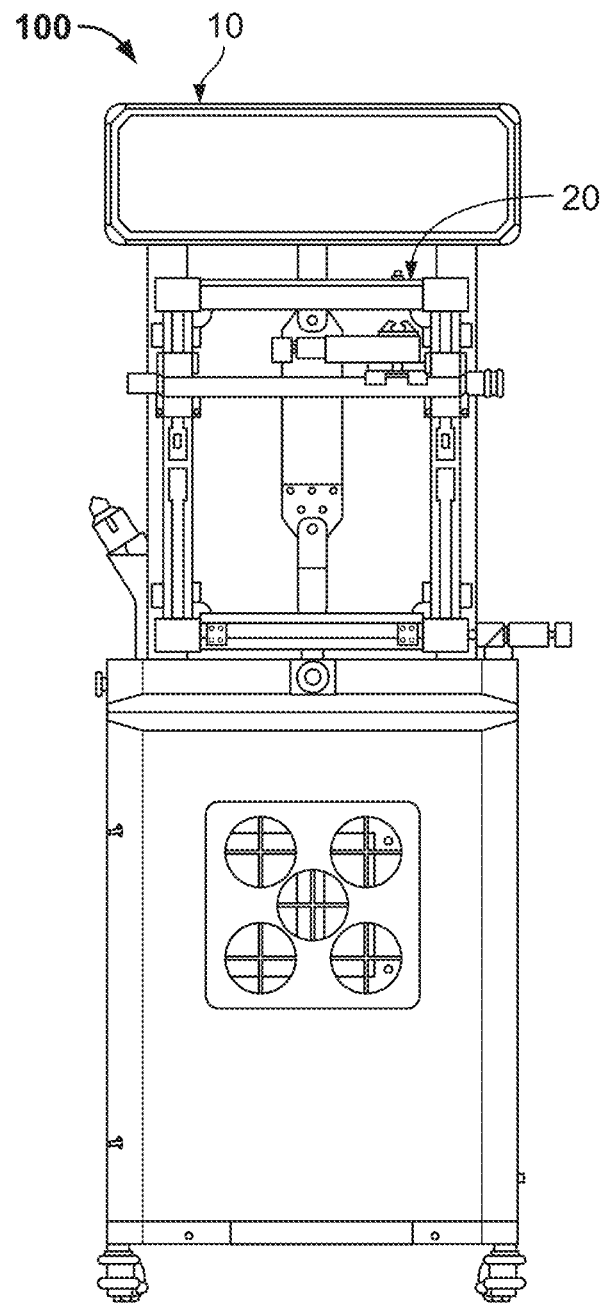

The system is primarily composed of a test system (10) and a scanning system (20), where the scanning system (20) is integrated and secured with the test system (10) through a pair of supporting columns (30), as show in FIGS. 3a & 3b which respectively illustrate side and rear views of the integrated system (100) as shown in FIG. 2, with the 3D scanning system (20) and the test system (10), in accordance to an exemplary embodiment of the present invention. First, the test system (10) is primarily composed of an actuator (12) and a cross-head assembly (14), where the test system (10) houses several hydraulic units (not shown) specially designed and arranged to drive the actuator (12) and the cross-head assembly (14) in order to apply a desired load and displacement on the object under test, i.e. CFRP composite (150). The test system (10) can also be referred as a servo-controlled test system (10) to apply loading on the CFRP composite (150). The actuator (12) is a hydraulic actuator, with inner-mount linear encoder (not shown), used for applying desired loads and displacement under stated performance specifications. The hydraulic units include, but not limited to power pack, servo valves, accumulators, cooling unit, and heat-exchangers.

Figure 4A:
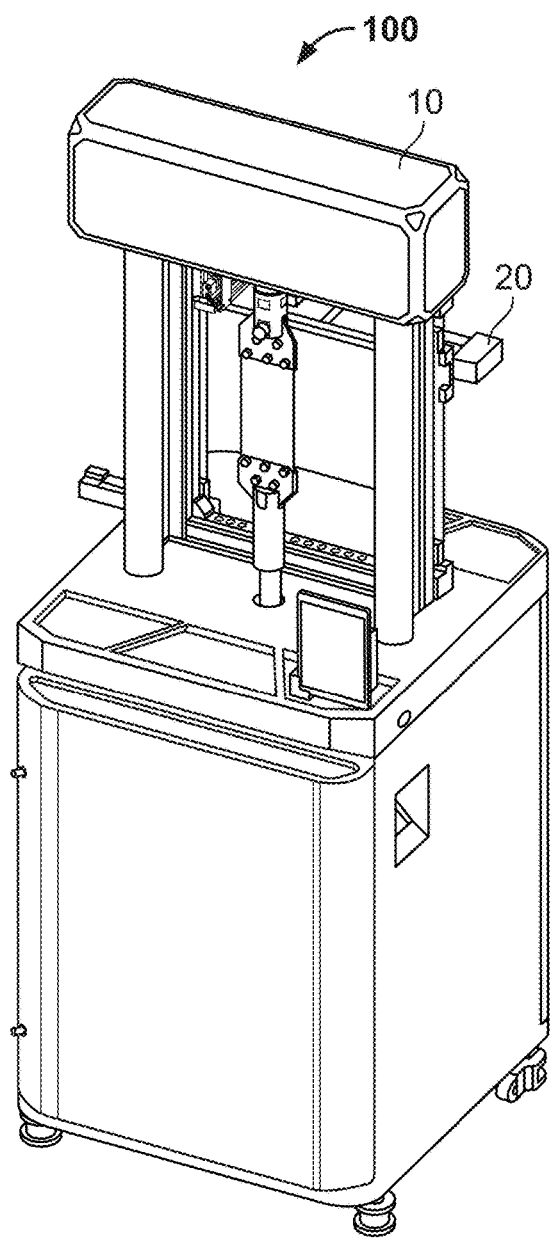
FIGS. 4a & 4b respectively illustrate isometric front and rear views of the integrated system as shown in FIG. 2, with the 3D scanning system and the test system, in accordance to an exemplary embodiment of the present invention.
Figure 4B:
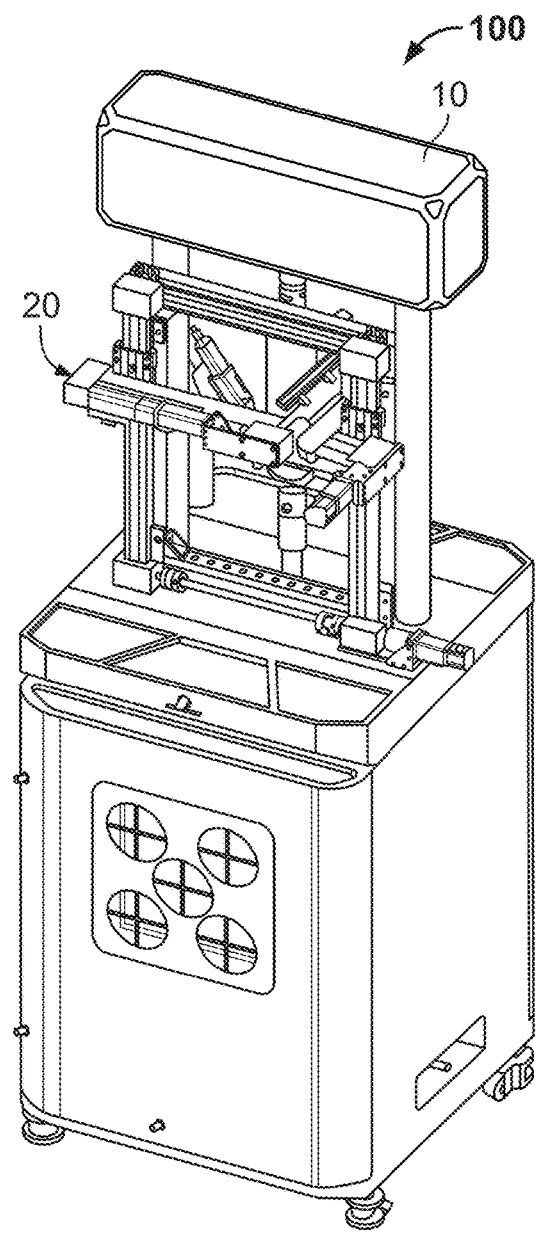

The test system (10) also houses a fixture assembly (40) associated with the actuator (12) and the cross-head assembly (14) of the test system (10) to hold the CFRP composite (150). The cross-head assembly (14) is housed with several load cells (not shown) of different weights and is servo-controlled by the hydraulic units to apply the desired and appropriate load on to the CFRP composite (150) while testing the CFRP composite (150) for mechanical behavior. The upper part of the test system (10) is provided with the movable cross-head assembly (14) enclosed with the load cell, which also facilitates to observe the machine status (Pump ON/OFF; waveform BUSY/IDLE) through varying LED colors. The lower part of the test system (10) is provided with an enclosure (80) to enclose the actuator (12), the hydraulic pump, the hydraulic units, the cooling unit and the controller being operated by the operator console (70), as shown in FIGS. 4a & 4b which respectively illustrate isometric front and rear views of the integrated system (100) as shown in FIG. 2, with the 3D scanning system (20) and the test system (10), in accordance to an exemplary embodiment of the present invention. The fixture assembly (40) has a pair of fixture elements (42) and a pair of gripping elements (44) which are attached between the actuator (12) and the cross-head assembly (14) for holding the CFRP composite (150) between the gripping elements (44). The fixture and gripping elements (42, 44) are specially designed and made for securely holding the CFRP composite (150) while applying desired loads on the CFRP composite (150) by the test system (10). The fixture and gripping elements (42, 44) are respectively divided into upper and lower fixture elements (42), and upper and lower gripping elements (44) for mounting the CFRP composite (150).

The scanning system (20) is primarily composed of a probe assembly (50) and a 3D (three-dimensional) scanner assembly (60). The probe arrangement or assembly (50) comprises a non-destructive sensing probe (52) for generating and measuring eddy current on the surface of the CFRP composite (150) and a sensing unit (54) for measuring distance between the probe tip and the surface of the CFRP composite (150). The sensing unit (54) is a laser sensor placed and positioned adjacent to the probe (52). The non-destructive sensing probe (52) acts as an eddy current sensing probe (52), where the probe (52) is usually loaded with a spring, i.e. spring loaded probe (52), to avoid damage in the unlikely event of direct contact with the surface of the CFRP composite (150). The probe (52) is secured into a fixture of the probe assembly (50) in such a way to position a probe tip with respect to the surface of the CFRP composite (150), i.e. the probe tip is facing and in proximity to the surface of the CFRP composite (150) without any contact to the CFRP composite surface, where the fixture is designed to hold the probe (52).

Figure 5:
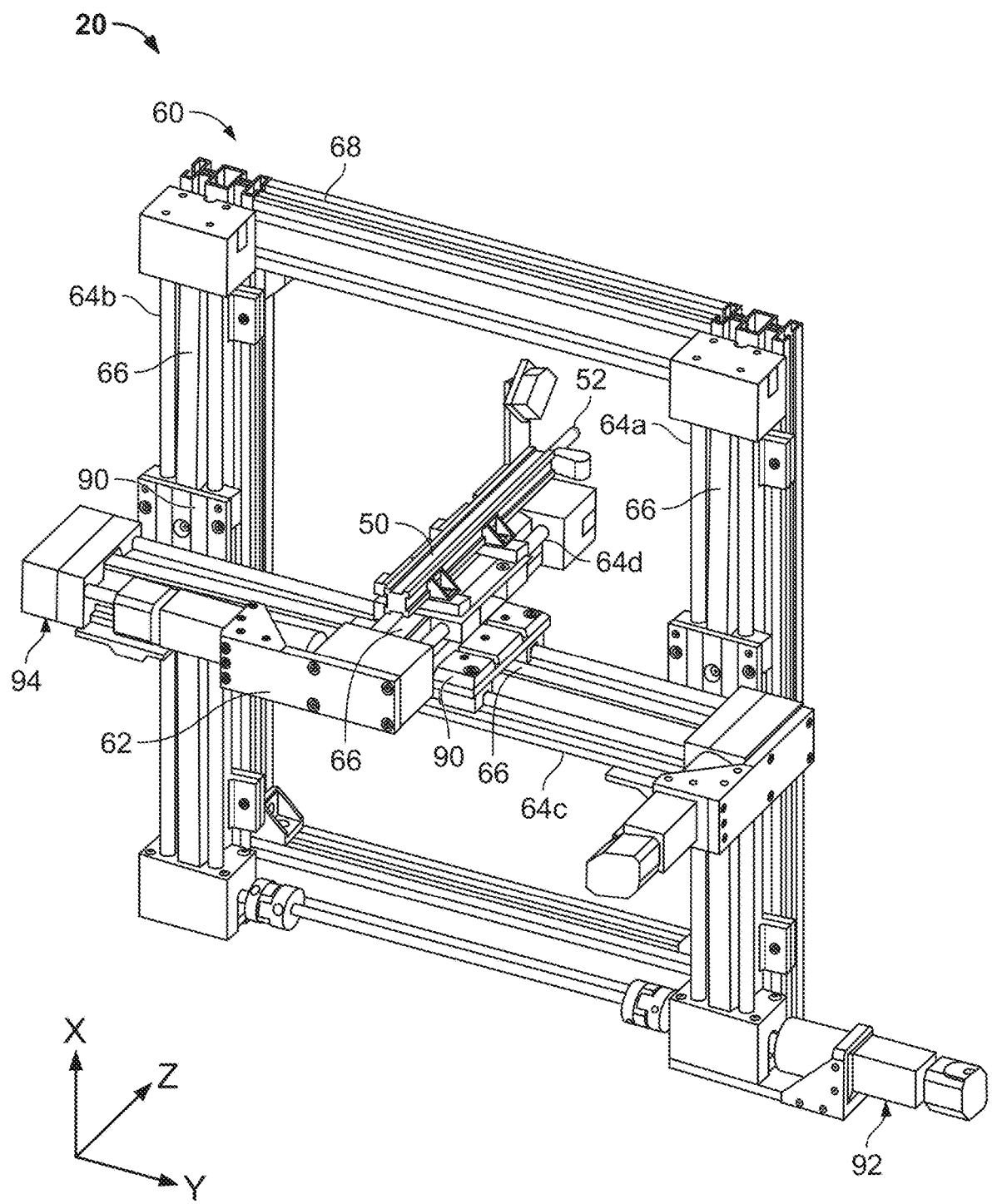
FIG. 5 illustrates a detailed view of the 3D scanning system as shown in FIG. 2, for XYZ movement of a sensing probe assembly, in accordance with an exemplary embodiment of the present invention.

FIG. 5 illustrates a detailed view of the 3D scanning system (20) as shown in FIG. 2, for XYZ movement of a sensing probe assembly (50), in accordance with an exemplary embodiment of the present invention. In the scanning system (20), the 3D scanner assembly (60) comprises a XYZ gantry system (62) that is arranged with several transmission elements (64a, 64b, 64c, 64d) fixed with each other to form 3-axis movement of the probe (52) over the CFRP composite (150), where the 3D scanner also acts and is referred as XYZ-eddy current scanner. The transmission elements (64a, 64b, 64c, 64d) housed in the 3D scanner are associated with the probe assembly (50) for movement of the probe assembly (50) along X-axis, Y-axis and Z-axis such that the probe (52) is moved over the entire surface area of the CFRP composite (150) for 3D scanning of the CFRP composite (150) and for detecting the defects in the CFRP composite (150). This XYZ gantry system (62) of the 3D scanner assembly (60) is driven by electric drives housed within the test system (10), where the electric drives also operate with the hydraulic units to drive the probe assembly (50) and the XYZ gantry system (62). The cross-head assembly (14) of the test system (10) and the XYZ gantry system (62) of the scanning system (20) are supported with the help of supporting columns (30) housed in the test system (10), where these supporting columns (30) are formed as hollow columns to accommodate concealed cables and wires of power supply, drives, sensors, controllers, etc.

In this present embodiment, the transmission elements are divided into four transmission elements, i.e. first, second, third and fourth transmission elements (64a, 64b, 64c, 64d). Each transmission element (64a, 64b, 64c, 64d) is formed with one or more rails (66) on it. As shown in FIG. 5, the first and second transmission elements (64a, 64b) are placed for the movement of probe (52) over the CFRP composite (150) in X direction with a movable length of 390 mm. Similarly, the third transmission element (64c) is placed for the movement of probe (52) over the CFRP composite (150) in Y direction with a movable length of 390 mm. Further, the fourth transmission element (64d) is placed for the movement of probe (52) over the CFRP composite (150) in Z direction with a movable length of 100 mm.

In particular, the first and second transmission elements (64a, 64b) are vertically attached to the supporting frame (68) with reference to the test system (10), particularly in line with the supporting columns (30) of the test system (10). The third transmission element (64c) is horizontally coupled between the first and second transmission elements (64a, 64b) such that the third transmission element (64c) is movable on the rails (66) of the first and second transmission elements (64a, 64b) in upward and downward directions, which results in the movement of the probe assembly (50) along the X-axis with respect to the CFRP composite (150).

The fourth transmission element (64d) is coupled to the third transmission element (64c) in perpendicular to the surface of the CFRP composite (150) such that the fourth transmission element (64d) is movable on the rails (66) of the third transmission element (64c) in a crosswise direction, i.e. longitudinally moving left and right directions, which results in the movement of the probe assembly (50) along the Y-axis with respect to the CFRP composite (150). The probe assembly (50) is placed on top of the fourth transmission element (64d) in a parallel manner and coupled to the fourth transmission element (64d) through couplers (90) such that the probe assembly (50) is movable along with the rails (66) of the fourth transmission element (64d) in a backward and forward direction, which results in the movement of the probe assembly (50) along the Z-axis with respect to the CFRP composite (150).

In addition, the operator console (70) is secured with a holder assembly (72) that is mounted on the test system (10), where a smart tap or smart phone (windows/android) is configured and used as the operator console (70) being secured with the tap-holder assembly (72) mounted on the plug-n-play test system (10). The operator console (70) is generally provided in the form of android tablet that facilitates quick operation of the test and scanning systems (10, 20) upon mounting the CFRP composite (150). The operator console (70) is configured and used for (i) operating the hydraulic drives for controlling the movement of the actuator (12) and the cross-head assembly (14); (ii) for controlling the fixture and gripping elements (42, 44) for holding the CFRP composite (150) under testing (i.e. during the static and cyclic test conditions); (iii) operating the electric drives for controlling the XYZ movements of the eddy current probe (52) in the probe assembly (50); and (iv) executing the test sequences of mounting the CFRP composite (150), applying the loads on the CFRP composite (150), displaying online test status, diagnosing test system (10) health and safety actions, and generating test reports and notifications. In addition, the computer (windows PC or Laptop) facilitates front end configuration of the integrated system (100) for executing test loading sequences, data acquisition, online graphical display of measurements and results and report generation.

In particular, the operator console (70) is operatively connected to the test system (10) and the scanning system (20) through a multi-channel control and data acquisition system housed in the test system (10) for controlling movement of the actuator (12) and the cross-head assembly (14) through the hydraulic units and for controlling 3-dimensional movement of the probe assembly (50) along X-axis, Y-axis and Z-axis through the XYZ gantry system (62) in a synchronous manner. The operator console (70) is configured for operating the hydraulic units and the electric drives to drive the actuator (12), the cross-head assembly (14), the probe (52) and the sensing unit (54) of the probe assembly (50), and the transmission elements (64a, 64b, 64c, 64d) of the XYZ gantry system (62). It should be noted that as both the test system (10) and the scanning system (20) of this integrated system (100) are driven by the single controller through the operator console (70), which facilitates synchronous control and measurements of loading and scanning systems. Such system integrates the test system (10) and the scanning system (20), which facilitates both mechanical testing and 3D scanning on the CFRP composite (150) in a simultaneous and synchronous manner to detect the defects in the CFRP composite sample (150) before or during or after the mechanical testing using the test system (10) without affecting its mechanical properties and without any need for dismounting the CFRP composite (150) from the test system (10) for the scanning process.

Figure 6:
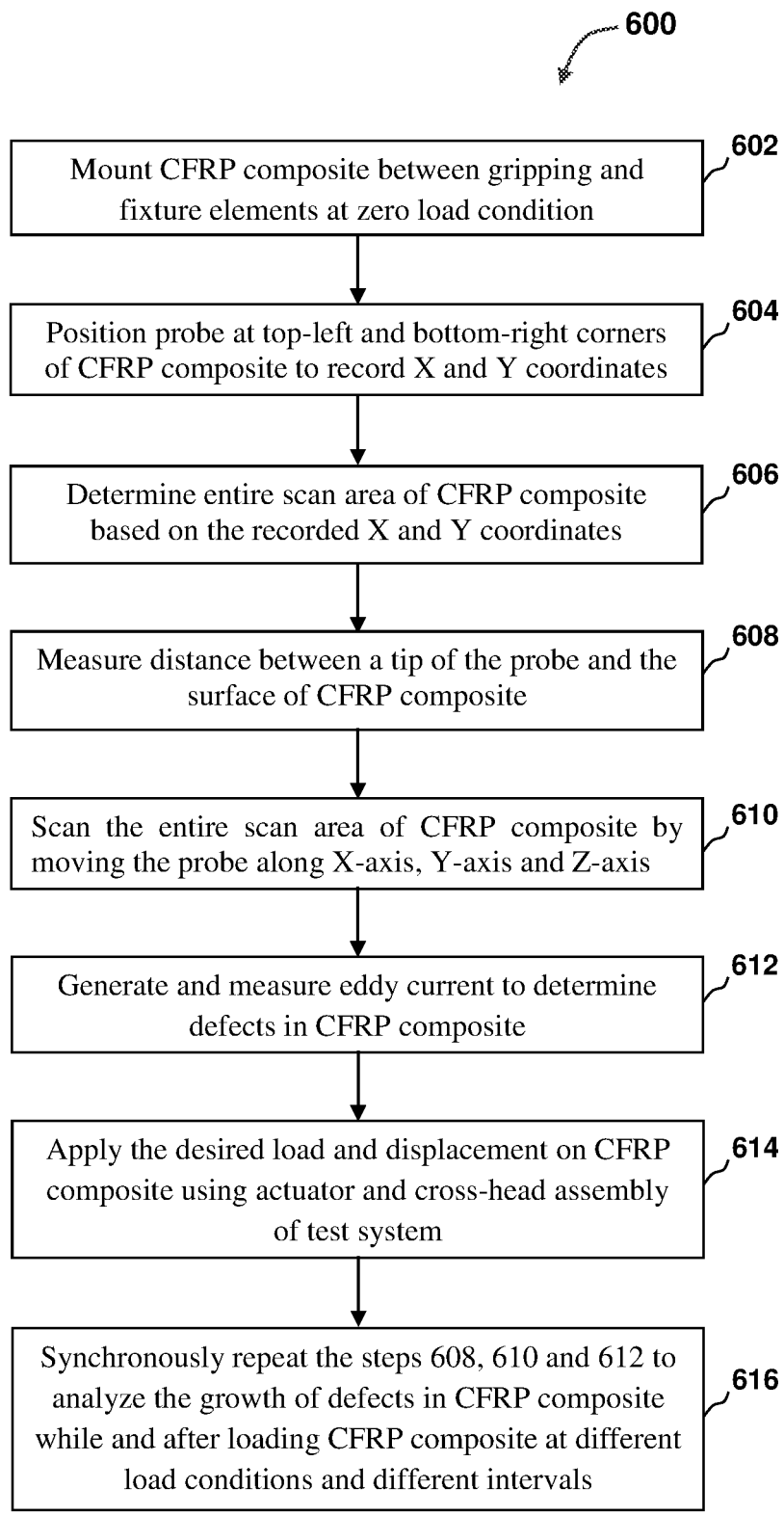
FIG. 6 illustrates a flow chart of a method of in-situ 3-axis scanning and detecting defects in the CFRP composite materials being loaded under the static and cyclic test conditions using the integrated system, in accordance with an exemplary embodiment of the present invention.
Figure 7:
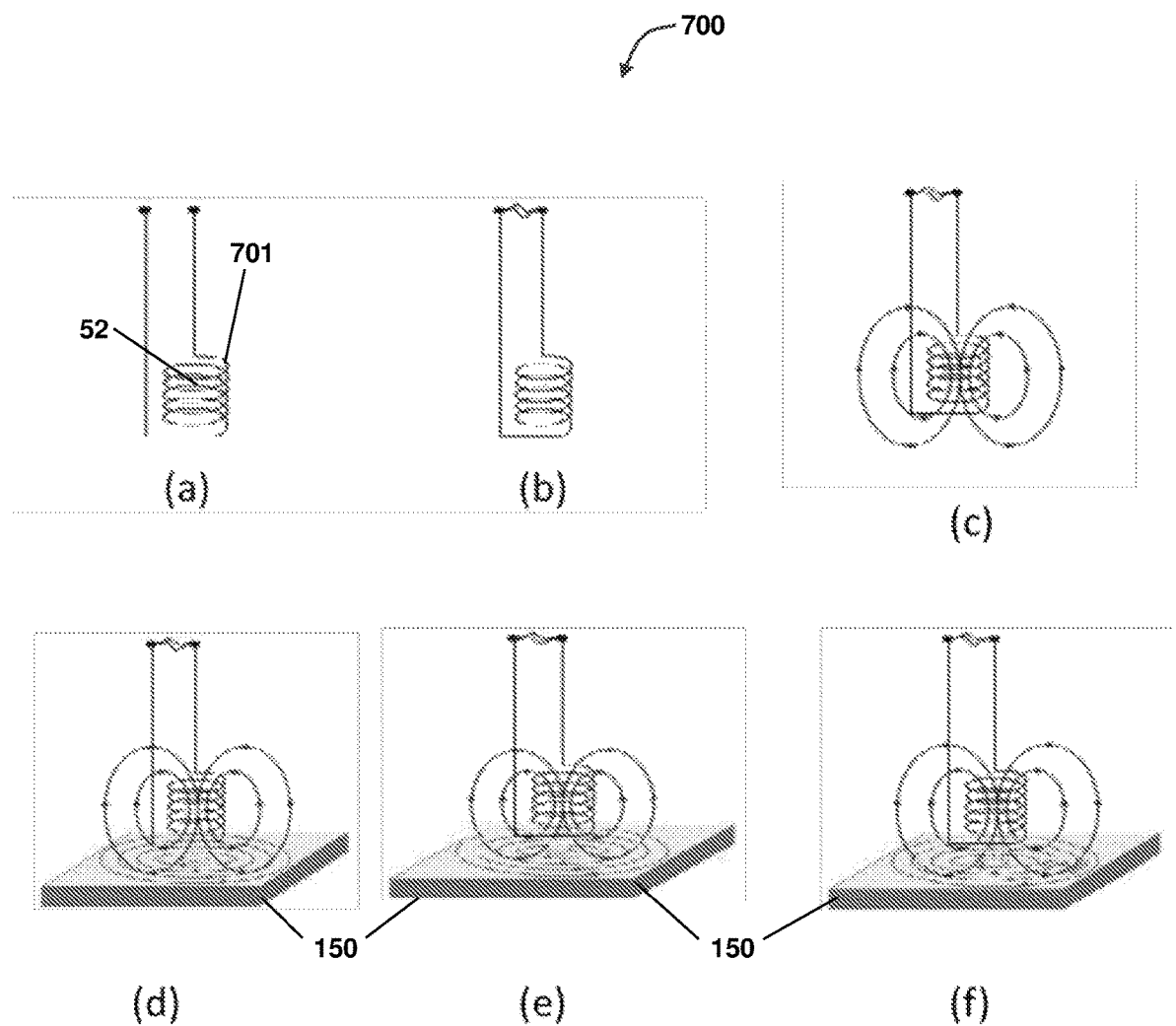
FIGS. 7(a)-7(f) illustrate a flow diagram representing a working principle of an eddy current sensing probe used in the integrated system, in accordance with an exemplary embodiment of the present invention.

FIG. 6 illustrates a flow chart (600) of a method of in-situ 3-axis scanning and detecting defects in the CFRP composite materials (150) being loaded under the static and cyclic test conditions using the integrated system (100), in accordance with an exemplary embodiment of the present invention. Once the system integrated with the XYZ scanning system (20) and the test system (10) is setup for its operation, various steps are carried out in a method to perform in-situ scanning and detecting of the defects in the CFRP composite (150) being loaded under static and cyclic test conditions. Initially, as illustrated at step 602, the CFRP composite (150) is mounted between the upper and lower gripping and fixture elements (44, 42) of the fixture assembly (40) at a zero load condition. The appropriate top and bottom grips and fixtures are selected for mounting the CFRP composite (150) and install the CFRP composite (150) on the test system (10). The CFRP composite (150) is mounted on the test system (10) using hydraulic or manual grips and ensure that there is zero load on the CFRP composite (150).

Then, as depicted at step 604, while maintaining a desired distance between the CFRP composite (150) and the non-destructive sensing probe (52), the non-destructive sensing probe (52) is primarily moved and positioned at top-left corner of the CFRP composite (150) to record the position of X and Y coordinates of the 3D scanner assembly, and similarly, the non-destructive sensing probe (52) is again moved and positioned at bottom-right corner of the CFRP composite (150) to record the position of X and Y coordinates of the 3D scanner assembly. The X and Y coordinates, noted corresponding to the top-left and bottom-right corners of the CFRP composite (150), thus define the total area of the CFRP composite (150) to be scanned.

Thereafter, as shown at step 606, the entire scan area of the CFRP composite (150) is determined based on the recorded X and Y coordinates of the 3D scanner assembly. Then, as depicted at step 608, the distance between a tip of the sensing probe (52) and the surface of the CFRP composite (150) is measured and maintained to perform the 3D scanning at the specific distance. Further, the 3D scanning is carried out by measuring and maintaining difference distance between the probe time and the CFRP composite surface for various analyses to detect the defects in the CFRP composite (150).

Further, as illustrated at step 610, the determined scan area of the CFRP composite (150) is scanned by operating and controlling 3-dimensional movement of the probe (52) along X-axis, Y-axis and Z-axis through the transmission elements (64a, 64b, 64c, 64d) of the XYZ gantry system (62) of the scanning system (20). The 3-dimensional movement (X, Y and Z movements) of the sensing probe (52) is operated and controlled to scan and cover the entire scan area of the CFRP composite (150) in a coarse scan manner and/or in a fine scan manner. The coarse scan is carried out to rapidly and quickly detect and find the zones of defects in the CFRP composite (150), whereas the fine scan is carried out to detect the in-depth defects in each identified defect zone in the CFRP composite (150), i.e. to get clear and complete picture of the defects local to the identified zones of the defect in the coarse scan.

Then, as shown at step 612, the eddy current is generated by the probe (52) on the surface of the CFRP composite (150), which is measured to determine the defects in the CFRP composite (150) at the zero load condition. Now, the probe (52) is moved over the entire scan area of the CFRP composite (150) to observe its condition and defects using the working principle of eddy current described below and illustrated in FIGS. 7(a)-7(f), before conducting any test on the CFRP composite (150) for mechanical properties by the test system (10).

Finally, as illustrated at step 614, the desired load and displacement are applied on the CFRP composite (150) by actuating the actuator (12) and the cross-head assembly (14) of the test system (10) through the hydraulic units. Then, the steps 608, 610 and 612 are synchronously repeated to analyze the occurrence of defects in the CFRP composite (150) while loading the CFRP composite (150) at different load conditions and different intervals and after the CFRP composite (150) is loaded with different load conditions and different intervals, as depicted at step 616. The scanning and testing of the CFRP composite (150) are synchronized to establish correlation between the growth of defects and physical behavior of the CFRP composite (150).

Now, the test sequences (simulation of loading patterns of service loads) for finding mechanical behavior (like Young's modulus, fatigue strength, toughness) of the CFRP composite (150) are defined along with the intervals of CFRP scanning using the operating console (70) mounted on the tab-holder assembly (72). The test sequences along with the eddy current scanning at defined intervals are executed and measured for the mechanical behavior to detect the defects in the CFRP composite (150). The mechanical properties and defect condition of the CFRP composite (150), evaluated during run-time, are also presented. At the end of the mechanical test, once again the CFRP composite (150) is scanned by the scanning system (20) to detect the defects in the CFRP composite (150).

FIGS. 7(a)-7(f) illustrate a flow diagram (700) representing a working principle of the eddy current sensing probe (52) used in the integrated system (100), in accordance with an exemplary embodiment of the present invention. The operation of the eddy current sensing probe (52) performs various sub-steps for generating and measuring the eddy current on the surface of the CFRP composite (150). Initially, a copper wire (701) is wound over a cylindrical ferrite core of the sensing probe (52), which results in the sensing probe (52) acting as an inductive coil. Then, a high-frequency alternating current is passed into the probe (52), where the high-frequency alternating current is amplified enough to produce large flux in the probe (52). When the high-frequency alternating current is passed through the probe (52), the probe (52) generates a transient magnetic field around the probe (52).

When the probe (52) with a source of magnetic field, is brought closer to the CFRP composite (150) (which is a conductive specimen), a spiral shaped current, i.e. eddy current, is generated and induced in the CFRP composite (150). The probe (52) is magnetically coupled with the CFRP composite (150) with respect to the movement of the probe (52) over the surface of the CFRP composite (150) to generate and penetrate eddy current on and into the surface of the CFRP composite (150). In particular, the movement of probe (52), under the influence of its own magnetic field, i.e. primary magnetic field, over the CFRP composite (150) (electrically conductive specimen) magnetically couples the probe (52) and the CFRP composite (150) under scan, which results into generation and penetration of the eddy current on the surface of the CFRP specimen. This generated eddy current can penetrate into few layers below the surface of the CFRP composite (150), where the depth of the current penetration is inversely proportional to the frequency of alternating current passed through the probe (52). The electromagnetic force (EMF), induced in the CFRP composite (150), is proportional to the rate of change of flux following Faraday's law.

Further, the eddy current generated in the CFRP composite (150) further generates its own magnetic field, i.e. secondary magnetic field that opposes the primary magnetic field, which is a cause for its generation, in the probe (52). The direction of the eddy current is based on Lenz's law, such that the secondary magnetic field generated by the eddy current in the CFRP composite (150) opposes the primary magnetic field in the probe (52). Then, the voltage is measured across the probe (52) to detect self-induced electromagnetic force (EMF) and mutual induction between the probe (52) and the CFRP composite (150). While scanning the CFRP composite (150) by moving the probe (52) over the surface of the CFRP composite (150), any change in the measured voltage across the probe (52) is determined to detect the defects in the CFRP composite (150).

During the excursion of the probe (52) over the CFRP composite specimen (150), whenever a defect is encountered, the path of the eddy current gets discontinued, which results into decrease in strength of the secondary magnetic field. This phenomenon further results into change in voltage across the probe (52) due to coupling between the probe (52) and the CFRP composite specimen (150). This change in voltage is taken to differentiate between the damaged and undamaged surface area of the CFRP composite specimen (150). Thus, the defined working principle of operation of this integrated texting and scanning system (20) enables to detect the condition of CFRP composite (150) before/during/after mechanical testing applied on the CFRP composite (150). It also helps to correlate defects in the CFRP sample to its mechanical properties and finally to take further appropriate actions during its design, production or application stage.

Figure 8:
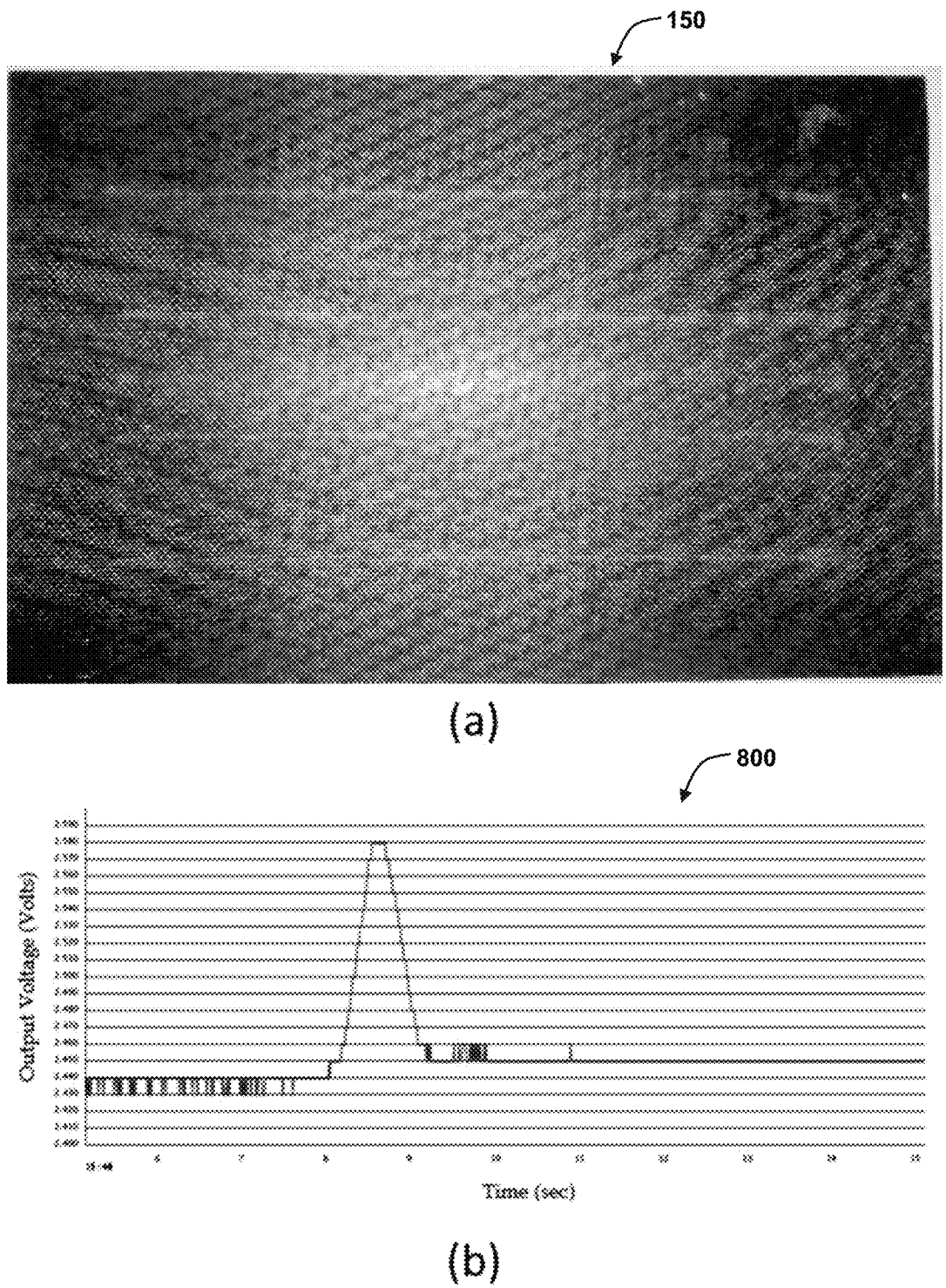
FIGS. 8(a) & 8(b) respectively illustrate a bi-directional CFRP laminate and a graph representing a time history of change in voltage across the sensing probe during excursion of it over the bi-directional CFRP laminate as illustrated in FIG. 8(a), in accordance with an exemplary embodiment of the present invention.

By using this integrated test and scanning system, a few of the results obtained from such tests and scanning carried out on the CFRP composite sample (150) are illustrated in FIGS. 8(a) and 8(b). FIG. 8(a) illustrates a bi-directional CFRP laminate (150), in accordance with an exemplary embodiment of the present invention. The present invention is validated by conducting eddy current testing on the CFRP composite sample (150). Here, the bi-directional CFRP laminate (150) (shown in FIG. 7a) of size 15×10×2 cm with 17 joule impact damage at the center, is taken for eddy current testing using the integrated system (100) of the present invention. Then, the voltage measured across the probe (52) (with 10 turns of copper wire and 5 MHz alternating current) while it is moved over the surface of the bi-directional CFRP laminate (150). The change in voltage near peak of the curve is noticed to be about 130 mV corresponding to the defect in the CFRP laminate (150), as shown in FIG. 8(b), which illustrates a graph (800) representing a time history of change in voltage across the sensing probe (52) during excursion of it over the bi-directional CFRP laminate (150) as illustrated in FIG. 8(a), in accordance with an exemplary embodiment of the present invention.

Figure 9:
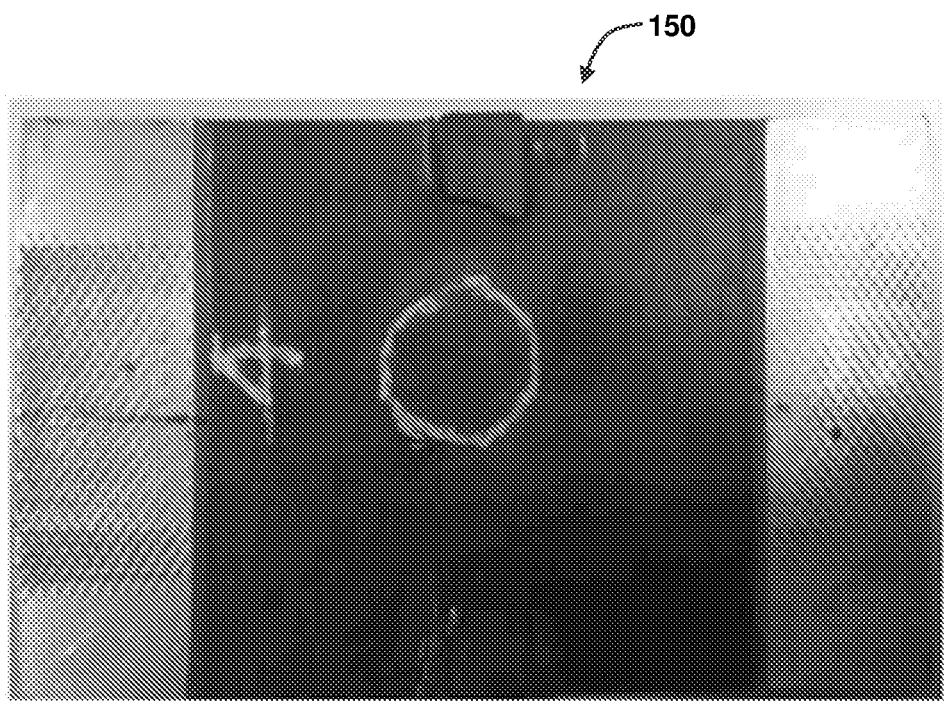
FIGS. 9(a) & 9(b) respectively illustrate a CFRP composite sample with a known defect taken for validation of 3D scanning while mounted on the test system and a corresponding 2D scan image of CFRP composite sample obtained from the 3D eddy current scanner mounted on the integrated system, in accordance with an exemplary embodiment of the present invention.
Figure 9:
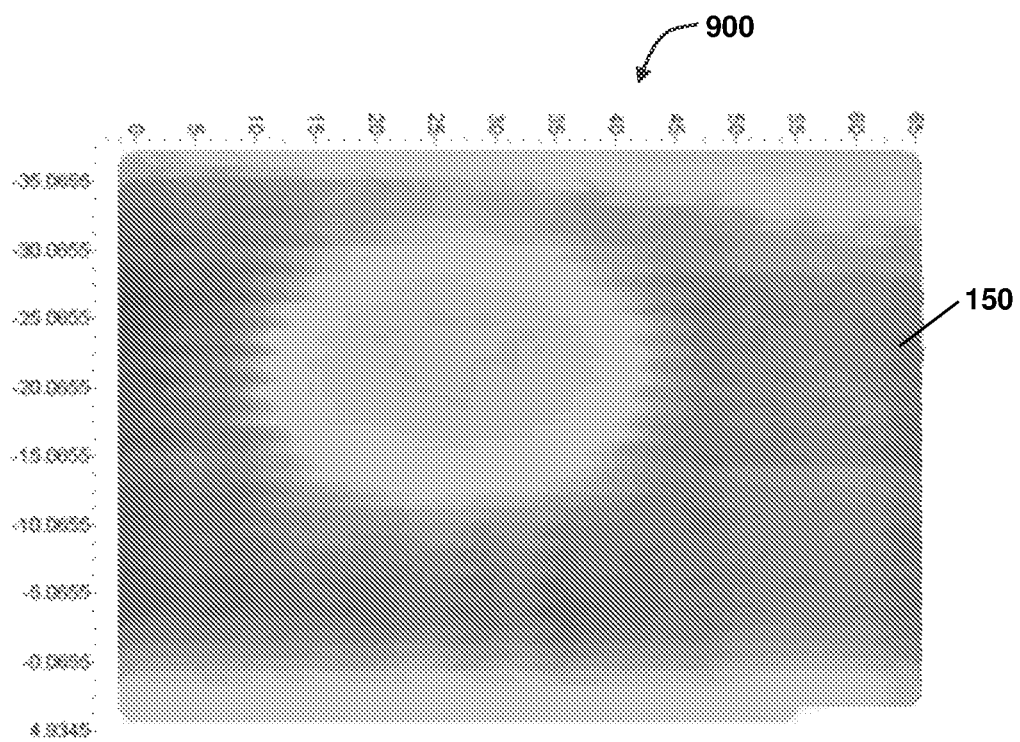

FIG. 9(a) illustrates the CFRP composite sample (150) with a known defect taken for validation of 3D scanning while mounted on the test system (10), in accordance with an exemplary embodiment of the present invention. Whereas, FIG. 9(b) illustrates a corresponding 2D scan image (900) of the CFRP composite sample (150) obtained from the 3D eddy current scanner mounted on the integrated system (100), in accordance with an exemplary embodiment of the present invention. It is clear from the picture of FIGS. 9(a) & 9(b) that the white patch corresponds to the known damage present in the CFRP composite sample (150), which is accurately analyzed with the help of this integrated system (100) of the present invention.

Figure 10:
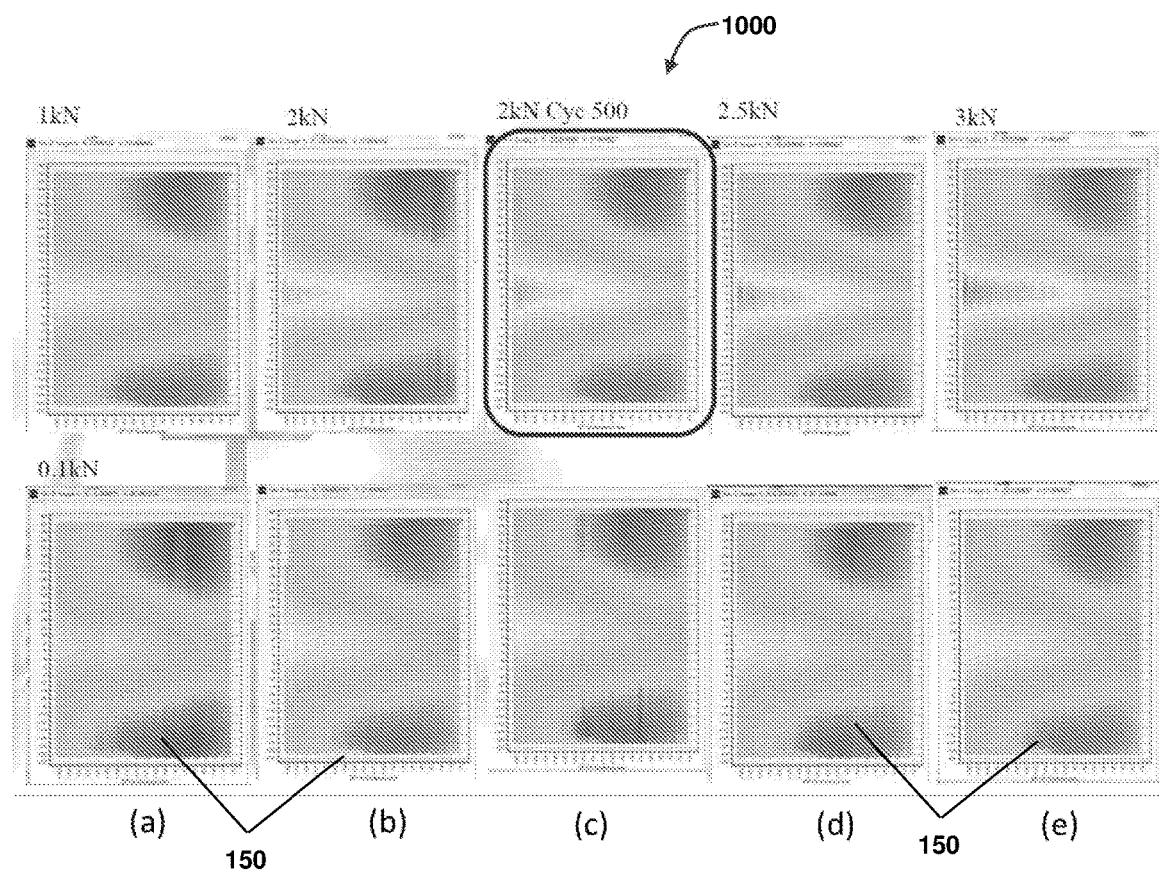
FIGS. 10(a)-10(e) respectively illustrate scan images taken over the surface area of the CFRP composite sample when the CFRP composite is subjected to incremental static loading and unloading using the test system, in accordance with an exemplary embodiment of the present invention.

FIGS. 10(a)-10(e) respectively illustrate scan images (1000) taken over the surface area of the CFRP composite sample (150) when the CFRP composite (150) is subjected to incremental static loading and unloading using the test system (10), in accordance with an exemplary embodiment of the present invention. Form the FIGS. 10(a)-10(e), it is observed that the size of the defect in the CFRP composite (150) is increased and decreased respectively when the CFRP composite (150) is loaded and unloaded under static conditions. FIG. 10a shows that the CFRP composite (150) is loaded to 1.0 kN and then unloaded to 0.1 kN. Similarly, FIGS. 10b, 10d and 10e respectively show that the CFRP composite (150) is loaded to 2.0 kN, 2.5 kN and 3.0 kN, and then unloaded each time to 0.1 kN. It is clear from these figures with increasing static load, the size of the defect also grows and comes back to original size on unloading of the CFRP composite (150). FIG. 10c shows growth of the defect size after 500 cycles of fatigue loading at constant amplitude of 2.0 kN. Here to, after unloading, the CFRP composite specimen (150) regains the original size.

Figure 11:
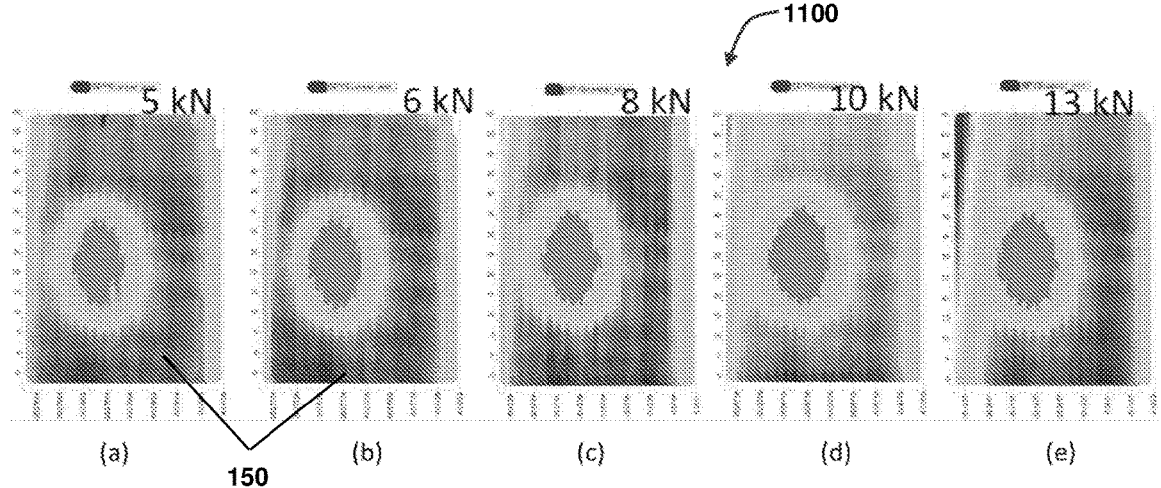
FIGS. 11(a)-11(e) respectively illustrate scan images showing the growth of defect in the CFRP composite specimen under constant amplitude fatigue loading over number of cycles, in accordance with an exemplary embodiment of the present invention.

FIGS. 11(a)-11(e) respectively illustrate scan images (1100) showing the growth of defect in the CFRP composite specimen (150) under constant amplitude fatigue loading over number of cycles, in accordance with an exemplary embodiment of the present invention. The below Table 1 provides loading conditions corresponding to FIGS. 11(a)-11(e) and defect size measured corresponding to these test conditions. Here it is clear that the defect size increases with respect to increase in the loading amplitude and number of loading cycles. FIG. 11(e) indicates the size of the defect cannot increase further.

TABLE 1

Defect Size with respect to constant amplitude loading cycles

| FIG. | Amplitude | Cycles | Area (mm$^2$) |
| --- | --- | --- | --- |
| 11a | 5.0 kN | 5000 | 202 |
| 11b | 6.0 kN | 10000 | 206 |
| 11c | 8.0 kN | 35000 | 220 |
| 11d | 10.0 kN | 50000 | 236 |
| 11e | 13.0 kN | 1108206 | 233 |

The present invention of the integrated system (100) facilitates to provide the 3D scanner for scanning CFRP composites (150) subject to testing under static and cyclic loading, which provides integration of the 3D scanner with the servo controlled test system (10) equipped with integrated controls and applications (unified control system) for the test system (10) and the 3D scanner to conduct both (i) mechanical testing under static and/or cyclic loading as well as (ii) 3D scanning for defects in the CFRP composite (150). In particular, once the CFRP composite (150) is mounted on the test system (10), both the testing for mechanical properties and the scanning for defects can be performed in this integrated system (100) itself, which avoids the need for removal of the CFRP composite (150) for scanning after testing for mechanical properties.

Such system of the present invention achieves integration of the servo-controlled test system for simulating service loads on the CFRP composites and the scanning system (eddy current sensor and gantry system) for 3D scanning of the CFRP composites. It increases accuracy of analysis of the defects in the CFRP composite in a simple and economical manner to save enormous amount of time in both testing and scanning process. It is capable of achieving 3D scanning of the CFRP composites mounted on the test system without interrupting mechanical test process. Also, it provides non-contact position feedback servo control to maintain the specified constant gap between the probe (52) and the surface of the CFRP composite, and provision for programmable signal frequency and strength to allow sweeping of both during scanning. It scans the CFRP composite specimen for defects when it is under controlled strain or load conditions, and incorporates a camera to analyze local load or strain measurement through digital image correlation (DIC). Further, the synchronization of mechanical testing (subjecting the CFRP composite to desired load or strain) and 3D scanning for the defects in the CFRP composite establishes correlation between the growth of defects and mechanical behavior of the CFRP composite specimen. It permits to assign the test termination conditions based on the number or extent of defects identified using the scanner. Even though, the scanning system, here in this present invention, is demonstrated by integrating it with an automatic servo controlled loading frame, in principle, it can also be integrated on a manual or mechanical loading frame.

The foregoing description is a specific embodiment of the present invention. It should be appreciated that this embodiment is described for purpose of illustration only. It is evident to those skilled in the art that although the invention herein is described in terms of specific embodiments thereof, there exist numerous alternatives, modifications and variations of the invention. It is intended that all such modifications and alterations be included insofar as they come within the spirit and scope of the invention as claimed or the equivalents thereof. Hence all variations, modifications and alternatives that falls within the broad scope of the appended claims comes under the gamut of the invention.

We claim:

1. A system for in-situ 3-axis scanning and detecting defects in an object being loaded under static and cyclic test conditions, comprising:
   a test system having an actuator and a cross-head assembly that are actuated by a plurality of hydraulic units for applying a desired load and displacement on the object under test;
   a fixture assembly having a plurality of fixture elements and a plurality of gripping elements which are attached between the actuator and the cross-head assembly for holding the object under test;
   a scanning system integrated with the test system through a pair of supporting columns, wherein the scanning system comprising:
      a probe assembly having at least one non-destructive sensing probe to generate and measure eddy current on the surface of the object under test and at least one sensing unit to measure distance between a probe tip and the surface of the object under test; and
      a 3D scanner assembly having a XYZ gantry system arranged with a plurality of transmission elements that is associated with the probe assembly for movement of the probe assembly along X-axis, Y-axis and Z-axis such that the probe is moved over the entire surface area of the object under test for 3D scanning of the object under test;
   an operator console secured with a holder assembly mounted on the test system, wherein the operator console is operatively connected to the test system and the scanning system for controlling movement of the actuator and the cross-head assembly through the hydraulic units and for controlling 3-dimensional movement of the probe assembly along X-axis, Y-axis and Z-axis through the XYZ gantry system in a synchronous manner.

2. The system as claimed in claim 1, wherein the non-destructive sensing probe comprises an eddy current sensing probe that is loaded with a spring and secured into a fixture of the probe assembly in such a way to position the probe tip with respect to the surface of the object under test.

3. The system as claimed in claim 1, wherein the sensing unit comprises a laser sensor that is placed adjacent to the probe.

4. The system as claimed in claim 1, wherein the transmission elements are attached to a supporting frame which is secured to the supporting columns of the test system.

5. The system as claimed in claim 1, wherein each of the transmission elements is interdependently operated by motors and electric drives controlled by the operator console to provide rotary-to-linear motion transmission.

6. The system as claimed in claim 1, wherein the operator console is operatively connected to the test system and the scanning system through a multi-channel control and data acquisition system housed in the test system for operating the hydraulic units and the electric drives to drive the actuator, the cross-head assembly, the probe and the sensing unit of the probe assembly, and the transmission elements of the XYZ gantry system.

7. The system as claimed in claim 1, wherein the operator console is configured to execute test sequences of applying loads and scanning of the object under test, display online test status, diagnose test system health and safety actions, and generate test reports and notifications.

8. The system as claimed in claim 1, wherein the operator console controls the gripping elements of the fixture assembly for securely holding the object under test even during the static and cyclic test conditions.

9. The system as claimed in claim 1, wherein the fixture and gripping elements are respectively composed of upper and lower fixture elements, and upper and lower gripping elements for mounting the object under test.

10. The system as claimed in claim 1, wherein the transmission elements comprise first, second, third and fourth transmission elements each formed with one or more rails on it, where the transmission elements are coupled with each other through couplers for 3-dimensional movement of the transmission elements with respect to the object under test.

11. The system as claimed in claim 1, wherein the first and second transmission elements are vertically attached to the supporting frame with reference to the test system.

12. The system as claimed in claim 1, wherein the third transmission element is horizontally coupled between the first and second transmission elements such that the third transmission element is movable on the rails of the first and second transmission elements in an upward and downward directions with respect to the object under test for movement of the probe assembly along the X-axis.

13. The system as claimed in claim 1, wherein the fourth transmission element is coupled to the third transmission element in perpendicular to the surface of the object under test such that the fourth transmission element is movable on the rails of the third transmission element in a crosswise direction with respect to the object under test for movement of the probe assembly along the Y-axis.

14. The system as claimed in claim 1, wherein the probe assembly is placed in parallel and coupled to the fourth transmission element such that the probe assembly is movable along with the rails of the fourth transmission element in a backward and forward direction with respect to the object under test for movement of the probe assembly along the Z-axis.

15. The system as claimed in claim 1, wherein the cross-head assembly is housed with a load cell and servo-controlled by the hydraulic units to apply the desired load on the object under test.

16. The system as claimed in any of the preceding claim 1, wherein the object under test comprises a CFRP (Carbon Fiber Reinforced Polymers or Plastics) composite material and a bi-directional CFRP laminate.

17. A method for in-situ 3-axis scanning and detecting defects in an object being loaded under static and cyclic test conditions, comprising the steps of:
   (a) mounting the object under test between upper and lower gripping and fixture elements of a fixture assembly at a zero load condition;
   (b) positioning a non-destructive sensing probe at top-left and bottom-right corners of the object under test to record X and Y coordinates of a 3D scanner assembly while maintaining a desired distance between the object under test and the probe;
   (c) determining an entire scan area of the object under test based on the recorded X and Y coordinates of the 3D scanner assembly;

(d) measuring distance between a tip of the sensing probe and the surface of the object under test;

(e) scanning the determined scan area of the object under test by operating and controlling 3-dimensional movement of the probe along X-axis, Y-axis and Z-axis through a plurality of transmission elements of a XYZ gantry system;

(f) generating and measuring eddy current on the surface of the object under test by the probe to determine defects in the object under test at the zero load condition; and (g) applying a desired load and displacement on the object under test by actuating an actuator and a cross-head assembly of a test system through a plurality of hydraulic units, and synchronously repeating the steps (d), (e) and (f) to analyze the occurrence of defects in the object under test during and after loading at different load conditions and different intervals.

18. The method as claimed in claim 17, wherein the step of generating and measuring eddy current on the surface of the object under test by the probe, further comprising the steps of:

(a) passing a high-frequency alternating current to generate a transient magnetic field in the probe;

(b) magnetically coupling the probe and the object under test with the movement of the probe over the surface of the object under test to generate and penetrate eddy current on and into the surface of the object under test;

(c) measuring voltage across the probe to detect self-induced electromagnetic force (EMF) and mutual induction between the probe and the object under test; and (d) while scanning, determining whether any change in the voltage across the probe to detect the defects in the object under test.

19. The method as claimed in claim 17, wherein the movement of sensing probe is controlled to scan the object under test in a coarse scan to rapidly detect the zones of defects in the object under test and in a fine scan to detect the in-depth defects in each identified defect zone in the object under test.

20. The method as claimed in claim 17, wherein the scanning and testing of the object under test are synchronized to establish correlation between the growth of defects and physical behavior of the object under test.

21. The method as claimed in claim 17, wherein the object and er test comprises a CFRP (Carbon Fiber Reinforced Polymers or Plastics) composite material and a bi-directional CFRP laminate.

* * * * *